United States Patent Office 3,411,183
Patented Nov. 19, 1968

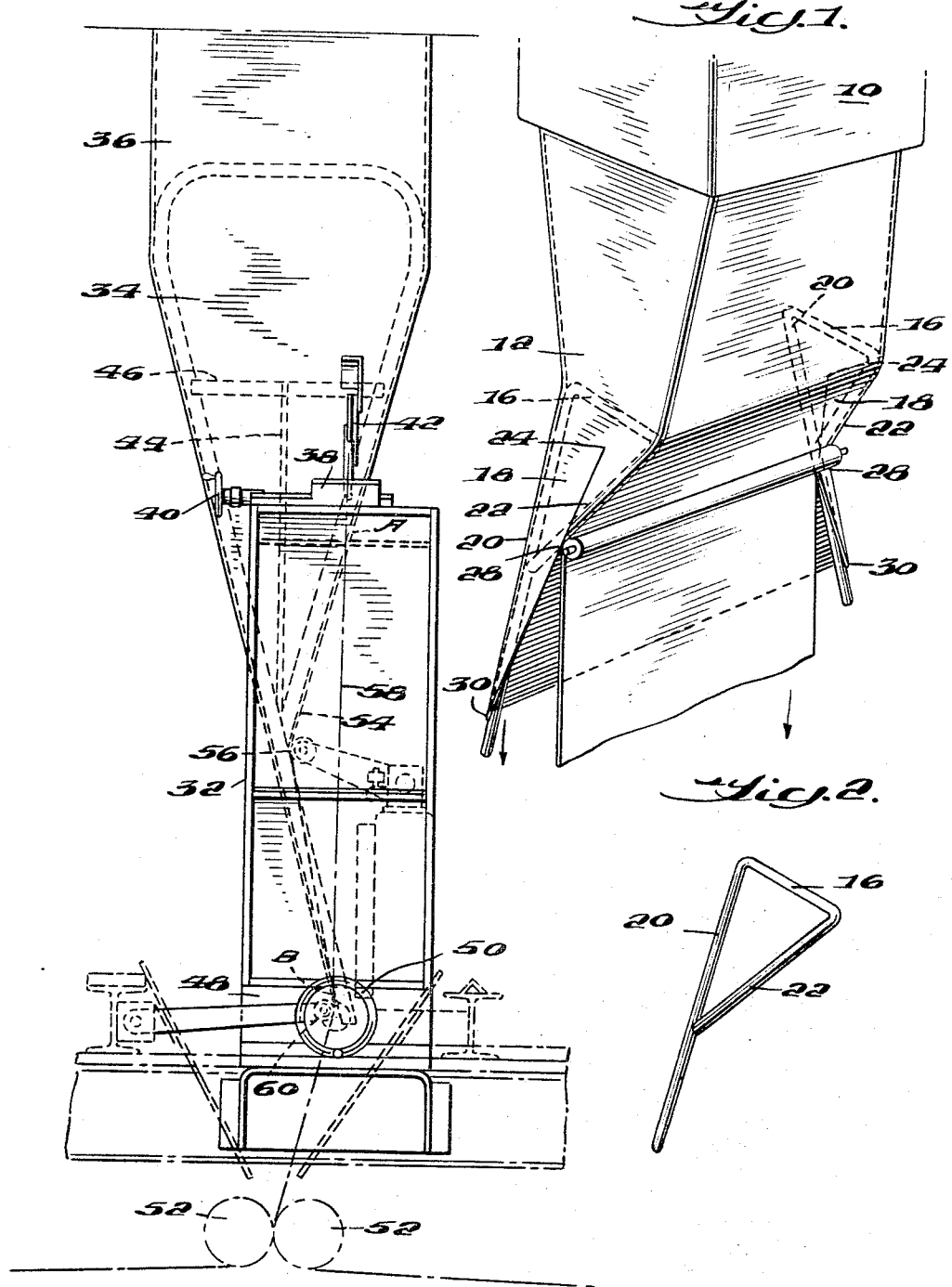

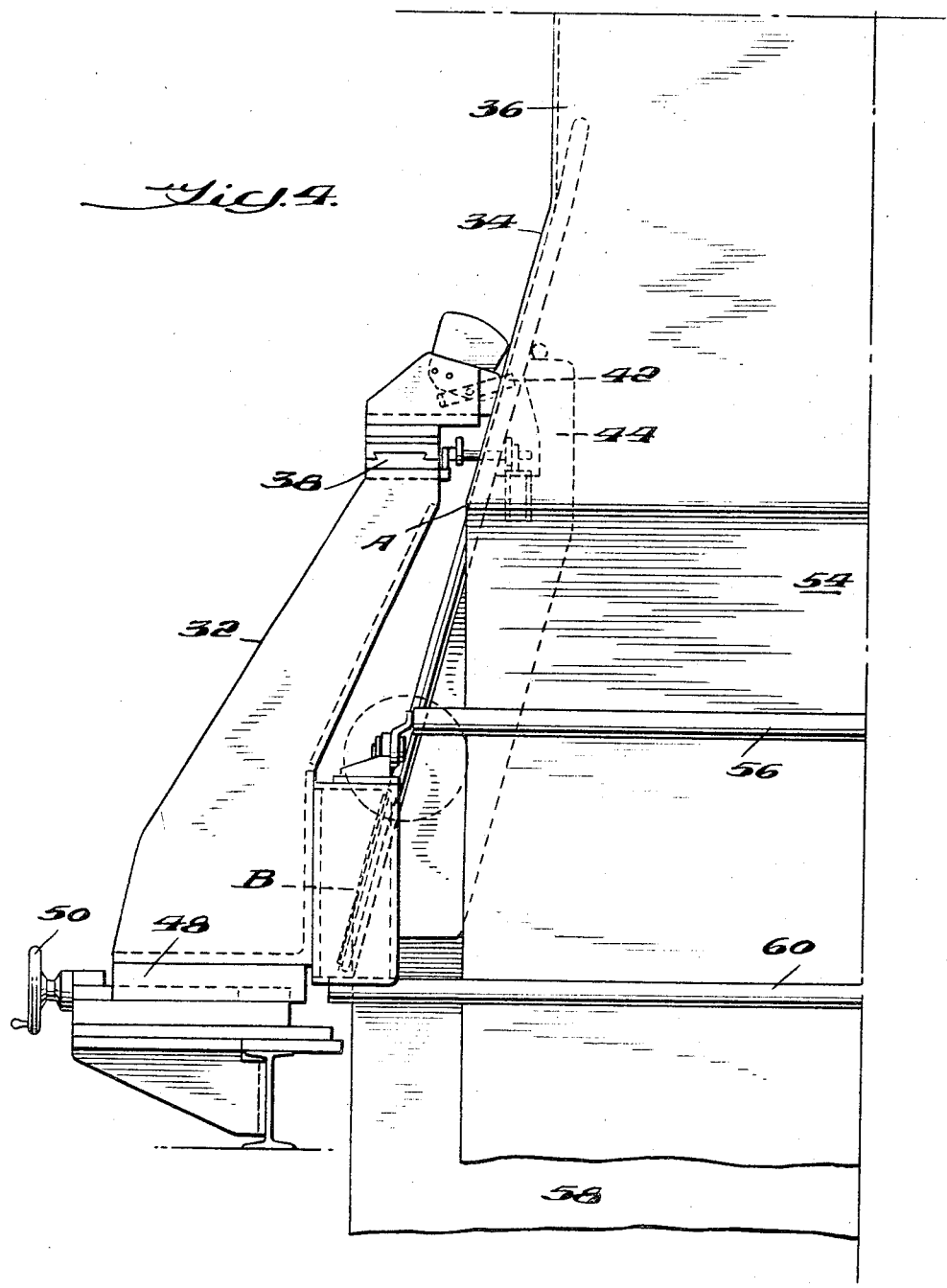

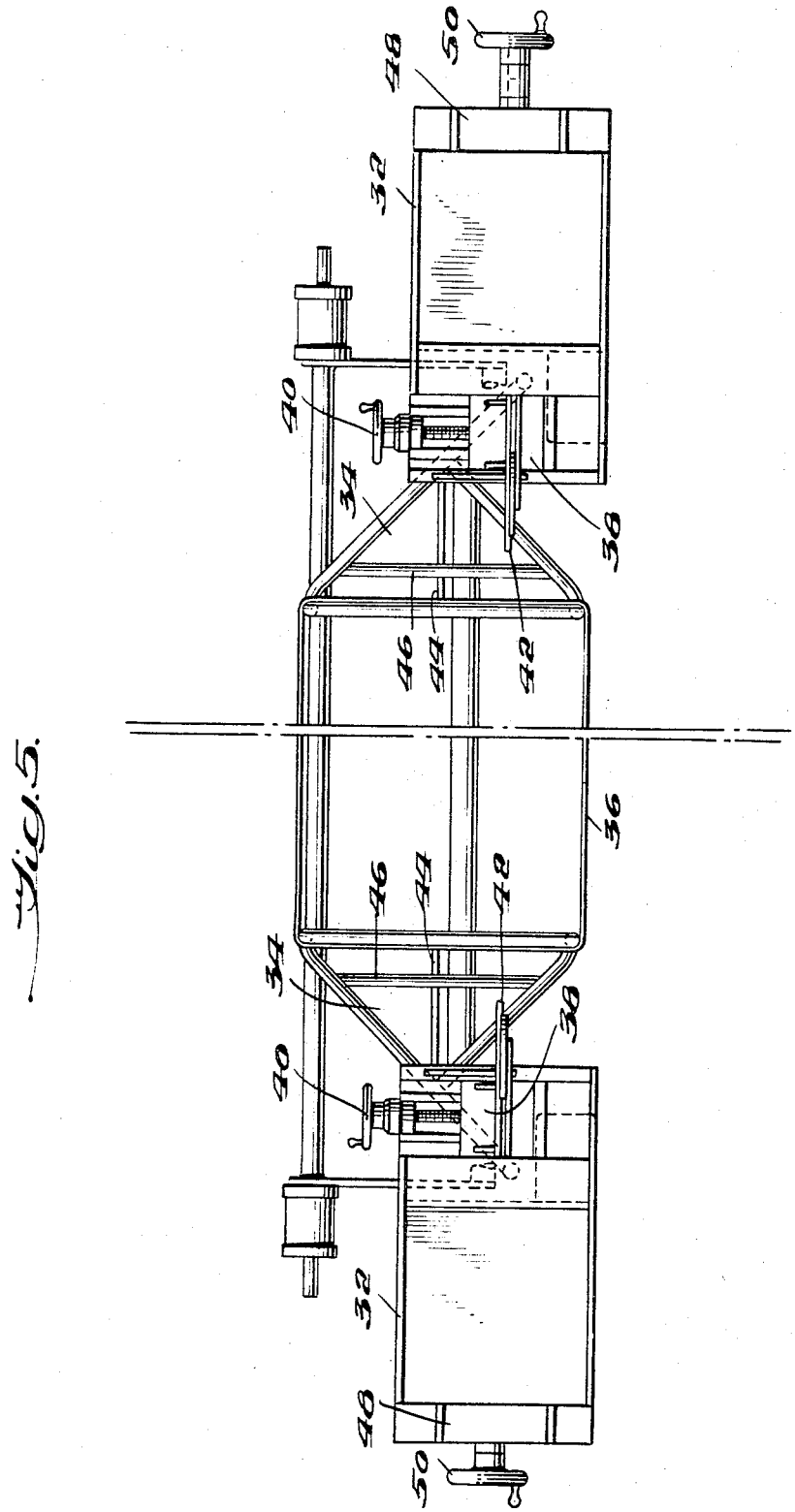

3,411,183
APPARATUS FOR SLITTING FILM INTO UNEQUAL WIDTH
William Penn Gaskill Hall, Berwyn, Pa., and Daniel Parkhurst MacMurray, Carrcroft, Wilmington, Del., assignors to E. I. du Pont de Nemours and Company, Wilmington, Del., a corporation of Delaware
Filed Jan. 11, 1966, Ser. No. 520,009
7 Claims. (Cl. 18—14)

ABSTRACT OF THE DISCLOSURE

Apparatus for continuously converting an extruded continuous tubing into at least two flattened films having different widths.

---

The use of tubular extrusion techniques to obtain polyolefin films is a well known expedient. These methods basically involve extruding a continuous tubing of the polymeric material having a circular cross section and then converting the tubing to a deflated flattened condition consisting of two plies of the film. While for an extended period of time great difficulty was encountered in obtaining wrinkle and crease free flat films of uniform gauge, these problems were alleviated by using the invention described in French Patent 1,335,335. This invention basically comprises continuously converting the tubing from the circular cross section to an essentially rectangular cross section prior to converting the tubing to a flattened condition.

In the above method, slitting of the tubing into two sections could conveniently be accomplished by simply placing slitting means after the point at which the tubing attained a rectangular cross section. However, to obtain flat, wrinkle free film section the slitting had to be accomplished such that the tubular film was slit into sections of equal width. Attempts to prepare film sections of unequal width resulted in wrinkling of the film sections when they were subsequently converted to the flattened condition. The necessity for preparing film sections of equal width frequently resulted in economic waste when the customer film width requirement differed from that of the film section as prepared.

However, there has now been discovered method and means by which flat, wrinkle free film sections of variable width can be continuously prepared from the polymeric tubing. Thus, according to the present invention there is provided an improved apparatus comprising, in combination, means for continuously forming a continuous tubing of a self-supporting film of polymeric material, said tubing having a circular cross section and means for continuously converting said tubing, either directly or indirectly, from a circular cross section to a substantially rectangular cross section, the improvement which comprises; means for continuously slitting said tubing having a rectangular cross section in a direction along the longitudinal axis thereof into at least two film sections of different width with at least one film section thereof being nonflat and none of said film sections being less than a given side of said rectangular cross section and unfolding means adapted to continuously convert the nonflat film sections to substantially flat film sections.

The apparatus of this invention is applicable to the preparation of flat sections of film having unequal widths formed from a single continuous tubing of polymeric material without regard to:

(1) the specific means by which the tubing is produced;
(2) whether or not the tubing is stretched;
(3) if stretched, whether by drawing over a mandrel or by expanding by fluid pressure means,
(4) the specific means by which the tubing is converted from a circular cross section to a substantially rectangular cross section, or
(5) whether or not the flat film sections of unequal width are, subsequent to their formation, brought together to form two plies of film.

The invention will be hereinafter described with reference to the accompanying drawings wherein:

FIGURE 1 is a perspective view of one application of the invention employing wishbone shaped formers as film unfolding means.
FIGURE 2 is a detailed perspective view of one of the wishbone shaped formers shown in FIGURE 1.
FIGURE 3 is an end elevation view of an application of the invention employing a preferred wishbone shaped former and depicting cutting and adjusting means.
FIGURE 4 shows in side elevation the left hand half of the unit of FIGURE 3.
FIGURE 5 is a top plan view of the unit of FIGURE 3.

Referring to FIGURE 1, thermoplastic polymeric material is extruded from an annular die and, after cooling forms self-supporting polymeric film having a circular cross-section. The above steps are denoted generally by the block 10. As the film advances (advancing means not shown), its cross-sectional shape is converted to a rectangle at 12 by drawing it over the top edges 16 of the wishbone shaped formers 18 (supporting structure for formers not shown).

The structure of the wishbone shaped formers 18 is more particularly set out in FIGURE 2. They can be made of any smooth, non-corrosive rigid material though polished stainless steel is preferred. In FIGURE 1 the wishbone shaped formers 18 are arranged such that their top edges 16 are parallel and their regular extensions 20 and 22 are mutually downwardly divergent from the longitudinal axis of the advancing film. As the film advances it is slit (slitting means not shown) into nonflat sections of unequal widths at the points denoted by the numeral 24. Subsequently, as the nonflat film sections advance over the wishbone shaped formers they become progressively flatter until at points 28 and 30 respectively, each exists as a completely flat, wrinkle free section. If desired, the legular extensions can be perforated and a forced air lubricant used to facilitate the advancement of the film sections over the wishbone shaped formers. Additionally, the term "downwardly," as used in this invention, is meant to denote the direction of the advancing film and is not restricted to the particular geometrical arrangement.

Referring to FIGURES 3, 4, and 5, the apparatus of the present invention can be more particularly understood. While the basic arrangement of the wishbone shaped formers is substantially the same as in FIGURE 1 additional structure is detailed. For convenience FIGURE 4 only sets out the left hand section of the unit, however, it is to be understood, as shown in FIGURE 5, that there is an identical right hand section.

With reference to these figures, the rigid superstructures 32 serve to support much of the apparatus. The superstructures and wishbone shaped formers 34 are inclined from the longitudinal axis of the advancing film 36 to accommodate the changes the film undergoes from round-to-rectangular cross sections without loss of tension, and to permit the cut section of film to unfold into flat sheets.

Movable slides 38 operated with hand wheels 40 are shown fixedly connected at the top of the superstructures 32. An industrial razor blade 42 is shown connected to the movable slide 38 by suitable holding means and thus can be variably positioned across the film width. The wishbone shaped formers 34 are connected to the superstructures 32 by means of the brackets 44 which are attached to the horizontal support bars 46. As can be seen, the horizontal support bars 46 are attached to the legular extensions of the wishbone shaped formers. Additionally, the superstructures 32 are attached to the movable slides 48, operated with hand wheels 50, the movable slides 48 being further secured to a foundation which serves as support for the whole apparatus. The inclusion of the movable slides 48 permits lateral adjustment between the two wishbone shaped formers 34 in order to accommodate various diameters of extruded polymeric tubing.

The particular film advancing means is a pair of pinch rolls 52 (drive not shown). The film 36 is advanced over the wishbone shaped formers 34 and cut into two sections of unequal width by the industrial razor blades 42. As the cut sections are further advanced, the legular extensions of the wishbone shaped formers serve to unfold the sections into flat pieces of film. The narrower of the film sections 54 is completely flat at point A and is subsequently guided around idler roll 56 which serves to maintain tension. The wider film section 58 is completely flat at a lower point B subsequent to which both flat pieces of film are brought into contact and passed over the idler roll 60 and drawn between the pinch rolls 52. After leaving the pinch rolls 52 the flat pieces of film can be separated and wound into individual mill rolls (not shown).

*Example 1*

Two flat sheets of polyethylene film having widths of 63.5" and 83.5" were continuously produced and wound into individual mill rolls by extruding molten polyethylene from an annular die into a tubing, cooling the tubing while expanding it to a 47" diameter, and converting the tubing from a circular cross section to a rectangular cross section by advancing it over wishbone shaped formers. The apparatus used was that described in FIGURES 3, 4, and 5. For this example, the wishbone shaped formers are each 23" across at their widest portion and symmetrically positioned about the longitudinal axis of the extruded tubing such that the periphery of the rectangular cross section is substantially equal to that of the circular cross section. The legular extensions of the wishbone shaped formers are 74" and 50.5" with each former inclined from the longitudinal axis of the tubing 16°. Two industrial razor blades are positioned opposite each other and intersect the film on the surfaces between the legular extensions of the wishbone shaped formers. The razor blades are displaced about 14" from the top edge of the formers and are 10" closer to the shorter legular extensions than to the longer. Obviously by changing the magnitude of this latter displacement (i.e. 10") various width film sections can be obtained. After being cut, the film sections are advanced over the legular extensions of the wishbone shaped formers until they are completely flat subsequent to which they are wound into individual rolls. The rolls, thus formed, show no evidence of film wrinkling or creasing and are quite satisfactory for commercial applications.

What is claimed is:

1. In an apparatus comprising, in combination, means for continuously forming a continuous tubing of a self-supporting film of polymeric material, said tubing having a circular cross section and means for continuously converting said tubing from a circular cross section to a substantially rectangular cross section, the improvement which comprises; means for continuously slitting said tubing having a rectangular cross section in a direction along the longitudinal axis thereof into at least two film sections of different width with at least one film section thereof being nonflat and none of said film sections being less than a given side of said rectangular cross section, and unfolding means adapted to continuously convert the nonflat film sections to substantially flat film sections.

2. The apparatus of claim 1 wherein the means for continuously converting the tubing from a circular cross section to a rectangular cross section is such that the periphery of the tubing having a circular cross section is substantially equal to the periphery of the tubing having a rectangular cross section.

3. The apparatus of claim 2 wherein the unfolding means is a pair of wishbone shaped formers, said formers comprised of rigid legular extensions of unequal length which are symmetrically positioned about and mutually downwardly divergent from the longitudinal axis of the tubing and over which the nonflat film sections are drawn, said rigid legular extensions being of sufficient length such that the nonflat film sections remain in contact therewith until they are substantially flat.

4. The apparatus of claim 3 wherein the means for continuously slitting the tubing is a pair of knives placed opposite each other and positioned such that they intersect the tubing between the rigid legular extensions of the individual wishbone shaped formers, the points of intersection being nearer the shorter of the rigid legular extensions.

5. The apparatus of claim 4 wherein the means for continuously converting the tubing from a circular cross section to a rectangular cross section is provided by drawing the tubing over a shaper, said shaper comprising the upper ends of the rigid legular extensions of the pair of wishbone shaped formers.

6. The apparatus of claim 5 with means for variably adjusting the position of the knives between the rigid legular extensions of the individual wishbone shaped formers and means for variably adjusting the periphery of said shaper.

7. An apparatus comprising, in combination, means for continuously forming a continuous tubing of a self-supporting film of polymeric material, said tubing having a circular cross section, means for continuously converting said tubing from a circular cross section to a substantially rectangular cross section, means for continuously slitting said tubing having a rectangular cross section in a direction along the longitudinal axis thereof into at least two film sections of different width with at least one film section thereof being nonflat and none of said film sections being less than a given side of said rectangular cross section, and unfolding means adapted to continuously convert the nonflat film sections to substantially flat film sections.

References Cited

UNITED STATES PATENTS

| 2,631,332 | 3/1953 | Reber | 18—143 |
| 2,641,022 | 6/1953 | Kress | 18—14 XR |
| 2,659,931 | 11/1953 | Dettmer. | |
| 2,923,194 | 2/1960 | Ambler et al. | 83—176 |
| 3,156,149 | 10/1964 | Frizelle | 83—176 |

FOREIGN PATENTS

| 638,913 | 4/1962 | Italy. |

WILLIAM J. STEPHENSON, *Primary Examiner.*